(12) United States Patent
Shi et al.

(10) Patent No.: US 8,443,510 B1
(45) Date of Patent: May 21, 2013

(54) METHOD FOR UTILIZING AN ELECTRONIC LAPPING GUIDE FOR A BEVELED POLE IN A MAGNETIC RECORDING TRANSDUCER

(75) Inventors: Changqing Shi, San Ramon, CA (US); Ming Jiang, San Jose, CA (US); Lijie Guan, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 528 days.

(21) Appl. No.: 12/473,893

(22) Filed: May 28, 2009

(51) Int. Cl.
*G11B 5/127* (2006.01)
*H04R 31/00* (2006.01)

(52) U.S. Cl.
USPC .............. 29/603.16; 29/603.12; 29/603.13; 29/603.14; 29/603.15; 29/603.18; 360/121; 360/122; 360/317; 451/5; 451/41

(58) Field of Classification Search ........... 29/603.09, 29/609.12–603.16, 603.18; 451/5, 8, 10, 451/36, 37, 41
See application file for complete search history.

(56) References Cited

U.S. PATENT DOCUMENTS

| | | | |
|---|---|---|---|
| 4,157,497 A | 6/1979 | Eisen et al. |
| 4,670,732 A | 6/1987 | Church |
| 4,675,986 A | 6/1987 | Yen |
| 5,065,483 A | 11/1991 | Zammit |
| 5,210,667 A | 5/1993 | Zammit |
| 5,361,547 A | 11/1994 | Church et al. |
| 5,597,340 A | 1/1997 | Church et al. |
| 5,678,086 A | 10/1997 | Gandola et al. |
| 5,722,155 A | 3/1998 | Stover et al. |
| 5,742,995 A | 4/1998 | Amin et al. |
| 5,772,493 A | 6/1998 | Rottmayer et al. |
| 5,876,264 A | 3/1999 | Church et al. |
| 6,003,361 A | 12/1999 | Amin et al. |
| 6,027,397 A | 2/2000 | Church et al. |
| 6,047,224 A | 4/2000 | Stover et al. |
| 6,083,081 A | 7/2000 | Fukuroi et al. |
| 6,193,584 B1 | 2/2001 | Rudy et al. |
| 6,288,870 B1 | 9/2001 | Saliba |
| 6,347,983 B1 | 2/2002 | Hao et al. |
| 6,364,743 B1 | 4/2002 | Pust et al. |
| 6,399,401 B1 | 6/2002 | Kye et al. |
| 6,475,064 B2 | 11/2002 | Hao et al. |
| 6,532,646 B2 | 3/2003 | Watanuki |

(Continued)

FOREIGN PATENT DOCUMENTS

JP  2000067408 A  3/2000

OTHER PUBLICATIONS

Matsushita, et al., "Elaborate Precision Machining Technologies for Creating High Added Value at Low Cost", Fujitsu Sci. Tech. J., 43, 1, pp. 67-75, Jan. 2007.

*Primary Examiner* — Paul D Kim (57) ABSTRACT

A method for providing at least one transducer including magnetic structure and having an air-bearing surface (ABS) are described. The method includes providing a lapping electronic lapping guide (lapping ELG) and a targeting ELG. The lapping ELG and targeting ELG each are coplanar with the desired thickness of the magnetic structure and have a back edge at the distance from the ABS such that the ELG back edges are substantially aligned with the flare point. The targeting ELG has a front edge at a front edge distance from the ABS corresponding to an intersection of the bevel and the desired thickness. The method further includes lapping the transducer and terminating the lapping based on a first resistance of the lapping ELG and a second resistance of the targeting ELG.

14 Claims, 10 Drawing Sheets

U.S. PATENT DOCUMENTS

| | | | |
|---|---|---|---|
| 6,609,948 B1 | 8/2003 | Fontana, Jr. et al. |
| 6,623,330 B2 | 9/2003 | Fukuroi |
| 6,674,610 B1 | 1/2004 | Thomas et al. |
| 6,684,171 B2 | 1/2004 | Church et al. |
| 6,699,102 B2 | 3/2004 | Reiley et al. |
| 6,728,067 B2 | 4/2004 | Crawforth et al. |
| 6,758,722 B2 | 7/2004 | Zhu |
| 6,760,197 B2 | 7/2004 | Boutaghou et al. |
| 6,786,803 B2 | 9/2004 | Crawforth et al. |
| 6,793,557 B2 | 9/2004 | Bunch et al. |
| 6,846,222 B2 | 1/2005 | Church et al. |
| 6,857,937 B2 | 2/2005 | Bajorek |
| 6,884,148 B1 | 4/2005 | Dovek et al. |
| 6,935,923 B2 | 8/2005 | Burbank et al. |
| 6,950,289 B2 | 9/2005 | Lam et al. |
| 6,982,042 B2 | 1/2006 | Church et al. |
| 7,014,530 B2 | 3/2006 | Kasiraj et al. |
| 7,139,152 B2 | 11/2006 | Mahnad et al. |
| 7,149,061 B2 | 12/2006 | Yamakura et al. |
| 7,206,172 B2 | 4/2007 | Ding et al. |
| 7,244,169 B2 | 7/2007 | Cyrille et al. |
| 7,245,459 B2 | 7/2007 | Cyrille et al. |
| 7,268,976 B2 | 9/2007 | Yamakura et al. |
| 7,271,982 B2 | 9/2007 | MacDonald et al. |
| 7,272,883 B2 | 9/2007 | Le et al. |
| 7,287,316 B2 | 10/2007 | Kasahara et al. |
| 7,333,300 B2 | 2/2008 | Church et al. |
| 7,359,152 B2 | 4/2008 | Matono et al. |
| 7,360,296 B2 | 4/2008 | Cyrille et al. |
| 7,393,262 B2 | 7/2008 | Biskeborn |
| 7,422,511 B2 | 9/2008 | Fukuroi |
| 7,551,406 B1 | 6/2009 | Thomas et al. |
| 7,554,767 B1 | 6/2009 | Hu et al. |
| 7,564,110 B1 | 7/2009 | Beach et al. |
| 7,603,762 B2 * | 10/2009 | Baer et al. ............ 29/603.12 |
| 7,643,250 B2 | 1/2010 | Araki et al. |
| 7,716,814 B2 | 5/2010 | Sasaki et al. |
| 7,770,281 B2 * | 8/2010 | Pentek ................ 29/603.12 |
| 7,788,796 B2 * | 9/2010 | Hsiao et al. ........... 29/603.16 |
| 7,861,400 B2 | 1/2011 | Lille |
| 8,151,441 B1 | 4/2012 | Rudy et al. |
| 8,165,709 B1 | 4/2012 | Rudy |
| 8,291,743 B1 | 10/2012 | Shi et al. |
| 8,307,539 B1 | 11/2012 | Rudy et al. |
| 2001/0004800 A1 | 6/2001 | Yoshida et al. |
| 2001/0051491 A1 | 12/2001 | Hao et al. |
| 2002/0012204 A1 | 1/2002 | Boutaghou et al. |
| 2002/0173227 A1 | 11/2002 | Lam et al. |
| 2003/0020467 A1 | 1/2003 | Kasahara et al. |
| 2003/0021069 A1 | 1/2003 | Crawforth et al. |
| 2004/0009739 A1 | 1/2004 | Zhu |
| 2004/0075942 A1 | 4/2004 | Bajorek |
| 2004/0097173 A1 | 5/2004 | Crawforth et al. |
| 2004/0179310 A1 | 9/2004 | Lam et al. |
| 2005/0023673 A1 | 2/2005 | Nowak |
| 2005/0028354 A1 | 2/2005 | Shindo et al. |
| 2005/0070206 A1 | 3/2005 | Kasiraj et al. |
| 2005/0164607 A1 | 7/2005 | Bajorek |
| 2005/0180048 A1 | 8/2005 | MacDonald et al. |
| 2005/0185345 A1 | 8/2005 | Ding et al. |
| 2005/0219752 A1 | 10/2005 | Takahashi |
| 2006/0027528 A1 | 2/2006 | Church et al. |
| 2006/0028770 A1 | 2/2006 | Etoh et al. |
| 2006/0034021 A1 | 2/2006 | Wu |
| 2006/0044683 A1 | 3/2006 | Matono et al. |
| 2006/0103990 A1 | 5/2006 | Ito et al. |
| 2006/0126222 A1 | 6/2006 | Aoki et al. |
| 2006/0139802 A1 | 6/2006 | Sasaki et al. |
| 2006/0168798 A1 | 8/2006 | Naka |
| 2007/0008660 A1 | 1/2007 | Yamakura et al. |
| 2007/0070543 A1 | 3/2007 | Gunder et al. |
| 2007/0246761 A1 | 10/2007 | Beach et al. |
| 2008/0013219 A1 | 1/2008 | Wu |
| 2008/0072418 A1 | 3/2008 | Kondo et al. |
| 2008/0144215 A1 | 6/2008 | Hsiao et al. |
| 2008/0273275 A1 | 11/2008 | Lille |
| 2009/0152235 A1 | 6/2009 | Hsiao et al. |
| 2009/0211081 A1 | 8/2009 | Boone, Jr. et al. |
| 2009/0268348 A1 | 10/2009 | Bonhote et al. |
| 2010/0162556 A1 | 7/2010 | Guruz et al. |
| 2010/0165513 A1 | 7/2010 | Bonhote et al. |
| 2010/0208391 A1 | 8/2010 | Gokemeijer |

\* cited by examiner

METHOD FOR UTILIZING AN ELECTRONIC LAPPING GUIDE FOR A BEVELED POLE IN A MAGNETIC RECORDING TRANSDUCER

BACKGROUND

Conventional magnetic heads typically employ lapping to fabricate structures within the head. For example, lapping is typically used in processing a write transducer. More specifically, after pole formation, lapping may be used to remove a portion of the device to expose the air-bearing surface (ABS). Lapping determines the windage, the length measured from the ABS to the flare point of the pole of the write transducer. The nose flare point is the distance from the ABS at which the angle the sides of the pole make with a plane parallel to the ABS increases. Similarly, lapping may be used in fabricating other structures in a head, such as the read sensor of a conventional read transducer.

Figure 1:
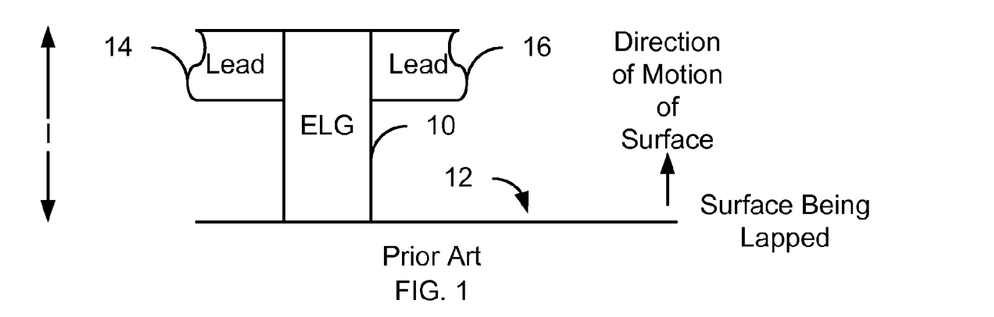
FIG. 1 depicts a conventional ELG as used in a conventional magnetic transducer.

In order to control lapping an electronic lapping guide (ELG) is typically used. FIG. 1 depicts a top view of a conventional ELG 10. The conventional ELG 10 is essentially a resistive stripe. Thus, the conventional ELG 10 is coupled with leads 14 and 16 that are used to determine the resistance of the conventional ELG 10. The conventional ELG has a length l from the surface 12 being lapped. As lapping continues, the surface 12 is worn away, and the length of the conventional ELG 10 decreases. As the length is reduced, the resistance of the conventional ELG 10 increases. Using the resistance of the conventional ELG 10, it can be determined when lapping should be terminated.

Figure 2:
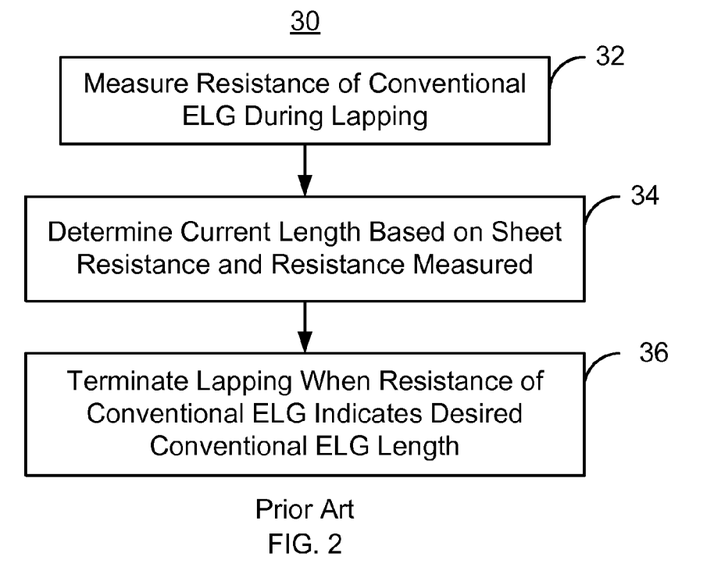
FIG. 2 is a flow chart depicting a conventional method for performing lapping utilizing a conventional ELG.

FIG. 2 is a flow chart depicting a conventional method 30 for performing lapping using the conventional ELG. The conventional method 30 is described in the context of the conventional ELG 10. The resistance of the conventional ELG 10 is measured during lapping of the transducer, via step 32. The current length of the conventional ELG 10 is determined based upon the resistance measured in step 32 and the sheet resistance of the conventional ELG 10, via step 34. The sheet resistance may be determined in a conventional manner using a conventional Van der Pauw pattern (not shown) is provided on the substrate on which the magnetic transducer is to be fabricated. The conventional Van der Pauw test pattern is a well known pattern that may be used to determine sheet resistance of a stripe, such as the conventional ELG 10. Thus, after step 34, the length corresponding to a particular measured resistance for the conventional ELG 10 is known. Alternatively, step 34 could simply convert a desired windage to an ELG length and the ELG length to a desired target resistance of the conventional ELG 10.

The lapping is terminated when the resistance of the conventional ELG 10 indicates that the desired length or target resistance of the conventional ELG 10 has been reached, via step 36. Because the conventional ELG 10 and structure, such as a read sensor or pole, both exist on the transducer being lapped, the lengths of the conventional ELG 10 and the structure change with lapping. Consequently, the lengths of the read sensor or pole may also be set in step 36.

Figure 3:
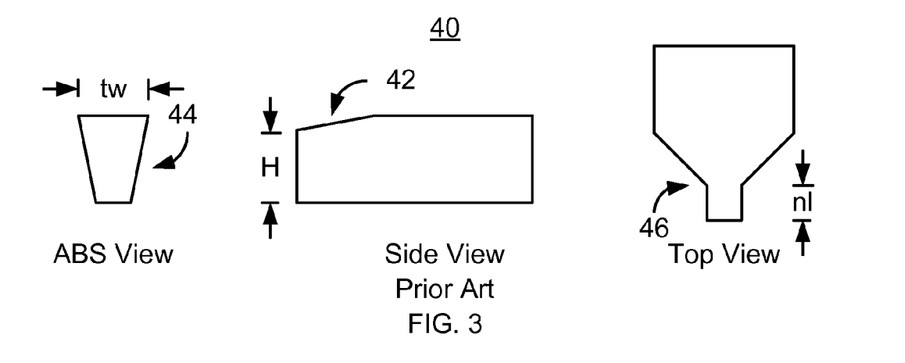
FIG. 3 depicts a conventional PMR pole in a conventional PMR transducer.

Although the conventional method 30 and conventional ELG 10 function, the desired windage or other desired length may not be easily determined for certain structures. For example, FIG. 3 depicts ABS, side, and top views of a conventional perpendicular magnetic recording (PMR) pole 40 that has a trailing edge bevel 42. For simplicity, FIG. 3 is not to scale. The conventional PMR pole 40 also has sidewalls 44 having a reverse angle and flare point 46. Stated differently, the conventional PMR pole 40 has a top wider than its bottom. Because of the combination of the bevel 42 and sidewalls 44, the windage, the track width, and the pole height change as part of the PMR pole 40 is lapped away. Thus, the geometry of the conventional PMR pole 40 make lapping to the desired windage (nl), track width (tw), and pole height (H) challenging.

Accordingly, what is needed is an improved method for providing and using an ELG in a magnetic transducer.

SUMMARY

A method and system for providing at least one transducer including magnetic structure and having an air-bearing surface (ABS) are described. The method and system include providing a lapping electronic lapping guide (lapping ELG) and a targeting ELG. The lapping ELG and targeting ELG each are substantially coplanar with the desired thickness of the magnetic structure and have a back edge at the distance from the ABS such that the ELG back edges are substantially aligned with the flare point. The targeting ELG has a front edge at a front edge distance from the ABS corresponding to an intersection of the bevel and the desired thickness. The method and system further include lapping the transducer and terminating the lapping based on a first resistance of the lapping ELG and a second resistance of the targeting ELG.

DETAILED DESCRIPTION OF THE PREFERRED EMBODIMENTS

Figure 4:
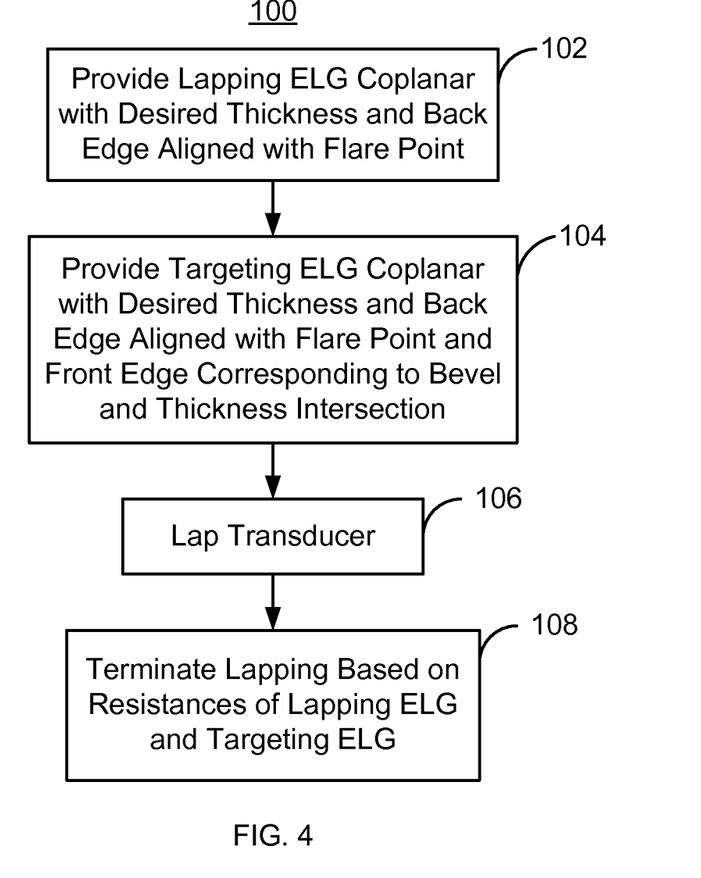
FIG. 4 is a flow chart depicting an exemplary embodiment of a method for providing a magnetic structure utilizing ELGs.
Figure 5:
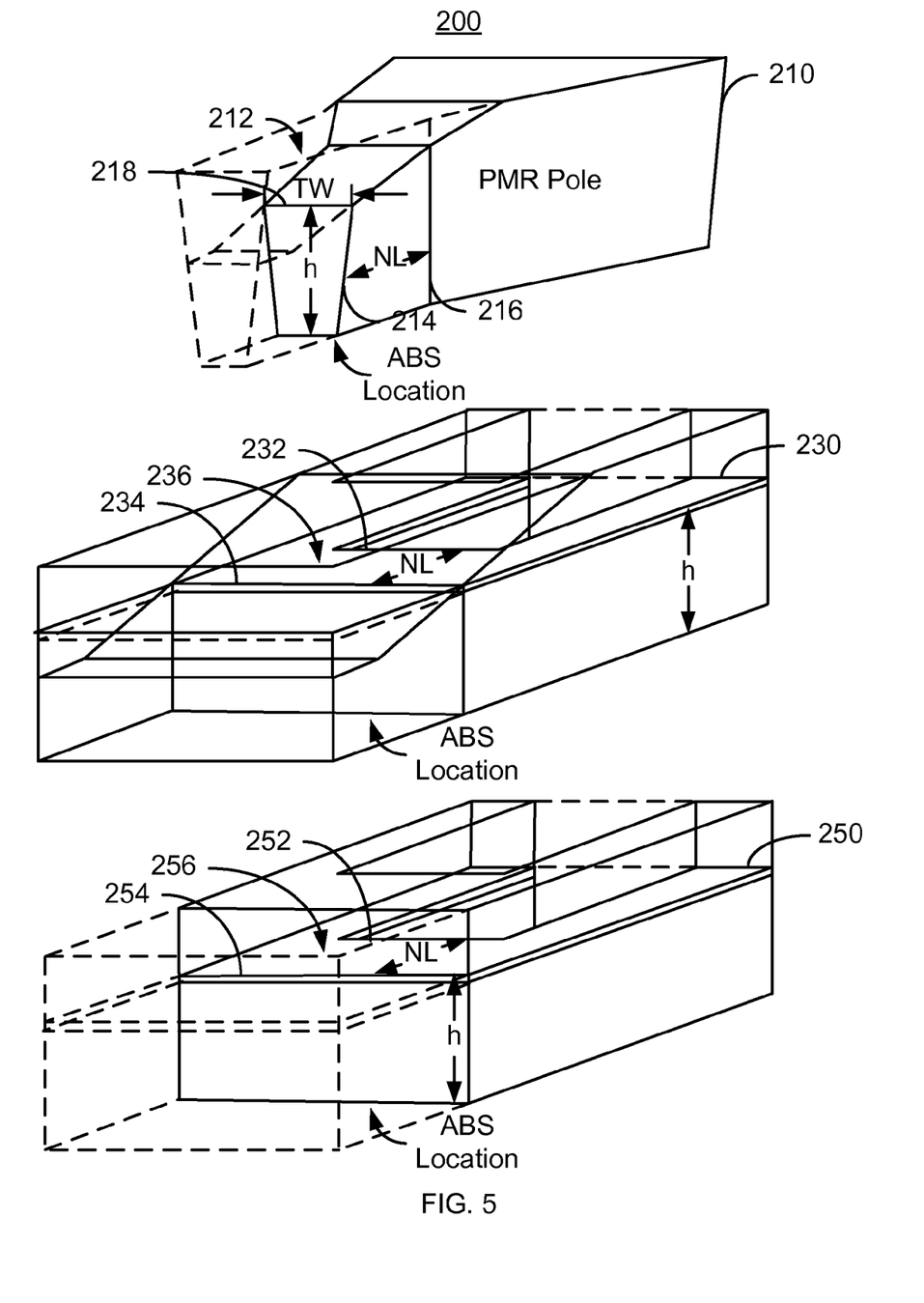
FIG. 5 depicts an exemplary embodiment of a transducer including the magnetic structure and ELGs.

FIG. 4 is a flow chart depicting an exemplary embodiment of a method 100 for providing a magnetic structure utilizing ELGs. For simplicity, some steps of the method 100 may be omitted. FIG. 5 depicts an exemplary embodiment of a portion of a transducer 200 for which the method 100 is used. For clarity, FIG. 5 is not to scale. The transducer 200 includes a magnetic structure 210, a targeting ELG 230, and a lapping ELG 250. For convenience, the magnetic structure 210, targeting ELG 230, and lapping ELG 250 are shown aligned vertically. However, in a physical device, the top edge 218, top surface 236, and top surface 256 would be in substantially the same plane. The transducer 200 also includes leads (not shown) for the ELGs 230 and 250. The transducer 200 may be part of a merged head including a read transducer and the write transducer. The transducer 200 may reside on a slider (not shown). The method 100 is thus described in the context of a transducer 200 in which the magnetic structure being fabricated is a PMR pole 210. However, the method 100 may be used for other magnetic structures in the write transducer 200 and/or a read transducer (not shown). As used herein, therefore, a magnetic structure may include any structure formed in a magnetic transducer. In addition, although one lapping ELG 250 and one targeting ELG 230 are shown for a single PMR pole 210/transducer, in another embodiment, fewer or greater numbers of the lapping ELG 250 and/or targeting ELG 230 could be used per transducer 200. In addition, the same number of lapping ELGs 250 and targeting ELGs per transducer need not be used. Further, the method 100 and transducer 200 are described in the context of a flare point and bevel. The flare point corresponds to a point of interest from which distance to the desired ABS/surface, such as a windage, is measured. Consequently, in some embodiments, the magnetic structure fabricated using the method 100 may include some other feature corresponding to the flare point. Similarly, the bevel corresponds to a surface, top or bottom, of the magnetic structure 210 which is not perpendicular to the ABS. The method 100 is also described in the context of a single structure 210 and two ELGs 230 and 250. However, the method 100 may be used for fabricating multiple transducers and/or multiple structures and may employ multiple ELG(s) at substantially the same time. Referring to FIGS. 4-5, the magnetic structure being fabricated has may be desired to adjoin the ABS. Thus, in the embodiment shown, the lapping being performed using the method 100 proceeds to the ABS location (the location at which the ABS is formed). However, in another embodiment, the lapping using the method 100 may be used to expose another surface. The PMR pole 210 being formed has a desired thickness, h, a bevel 212, and a flare point 206 a distance, NL (for nose length or windage) from the ABS. The PMR pole 210 may also have a desired track width, TW, and a surface 204 desired to be at the ABS once lapping is completed.

A lapping ELG 250 is provided, via step 102. FIG. 5 depicts the lapping ELG 250. In the embodiment shown in FIG. 5, the lapping ELG 250 is shown in solid lines. The material which may be removed from the transducer 200 in order to form the lapping ELG 250 and during lapping is shown in dashed lines. The lapping ELG 250 is substantially coplanar with the desired height, or thickness, h, of the magnetic structure. Thus, the lapping ELG 250 may be formed a distance h above layer underlying the PMR pole 210 (not shown in FIG. 5). Although described as being coplanar with the desired thickness and formed a distance above the underlying layer, the lapping ELG 250 does have some thickness. However, the thickness is generally small in comparison to the dimensions in the windage (perpendicular to the ABS) and track width (left-right in FIG. 5) directions. Step 102 also forms the lapping ELG 250 such that its back edge 252 is at the windage, NL, from the ABS. The back edge 252 of the lapping ELG 250 is, therefore, substantially aligned with the flare point 206 of the PMR pole 210 being formed. In one embodiment, therefore, the lapping ELG 250 may be formed by depositing a resistive structure at the desired height, h, and removing the portion of the resistive structure to form the back edge 252. The resistive structure may include materials such as at least one of Cr, Ru, Ta, and NiCr.

A targeting ELG 230 is also provided, via step 104. FIG. 5 also depicts the targeting ELG 230. The targeting ELG 230 is shown in solid lines. The material which may be removed from the transducer 200 in order to form the targeting ELG 230 and during lapping is shown in dashed lines. The targeting ELG 230 is substantially coplanar with the desired height, or thickness, h, of the magnetic structure. Thus, the targeting ELG 230 may be formed a distance h above layer underlying the PMR pole 210 (not shown in FIG. 5). Although described as being coplanar with the desired thickness and formed a distance above the underlying layer, the targeting ELG 230 does have some thickness. However, the thickness is generally small in comparison to the dimensions in the windage (perpendicular to the ABS) and track width (left-right in FIG. 5) directions. Step 104 also forms the targeting ELG 230 such that its back edge 232 is at the windage, NL, from the ABS. The back edge 232 of the targeting ELG 230 is, therefore, substantially aligned with the flare point 206 of the PMR pole 210 being formed. The front edge 234 of the targeting ELG 230 is at a location corresponding to an intersection between the bevel 212 and the desired thickness, h, of the PMR pole 210. In one embodiment, therefore, the targeting ELG 230 may be formed by depositing a resistive structure at the desired height, h, and removing the portion of the resistive structure to form the back edge 232. The resistive sheet may include materials such as at least one of Cr, Ru, Ta, and NiCr. The front edge 234 is also formed from the resistive sheet in step 104. In one embodiment, this is accomplished by exposing the targeting ELG 230 during formation of the bevel 212. Thus, material is removed from the transducer 200 in the region of the targeting ELG 230 in the same manner as material is removed from the PMR pole 210 to form the bevel 212. Consequently, the front edge 234 of the targeting ELG 230 is at the same location as the desired location of the top edge 218 of the front of the bevel 212.

The transducer 200 is lapped, via step 106. The lapping is terminated based on a first resistance of the lapping ELG 250 and a second resistance of the targeting ELG 230, via step 108. In one embodiment, step 108 may include measuring the resistances of the targeting ELG 230 and/or the lapping ELG 250 throughout lapping. The resistance of the targeting ELG 250 may be used to determine a resistance target for the lapping ELG resistance during lapping. Alternatively, the resistance of the targeting ELG 250 may be determined prior to lapping and the resistance target for the lapping ELG resistance determined prior to lapping. The resistance of the lapping ELG 250 is monitored throughout the lapping in step 106. Lapping may then be terminated in step 108 based on a comparison between the lapping ELG resistance and this resistance target. Thus, the transducer 200 may be lapped until the ABS location is exposed. Note that although the front edge 234 corresponds to the desired height of the bevel, the lapping may be terminated in step 108 prior to reaching the front edge 234 of the targeting ELG 230 or after lapping through some portion of the targeting ELG 230. Stated differently, the transducer 200 may be under-lapped, over-lapped, or lapped to the edge 234 of the targeting ELG 234 based on the resistances of the ELGs 230 and 250 and, therefore, the desired windage.

Through the use of the method 100, the lapping may be better controlled. In particular, the PMR pole 210 having the desired height, h, the desired track width, TW, and the desired windage NL may be formed. The geometry of the PMR pole 210 gives rise to variations in the height of the PMR pole 210 and width of the PMR pole 210 with the windage. These variations due to geometry can be accounted for using the targeting ELG 230 in combination with the lapping ELG 250 to determine when to terminate lapping. In addition, different processes are used to form the flare point 216, bevel 212, and reverse angle of the sidewalls 214 of the PMR pole 210. Variations in these processes translate to variations in the desired NL. Through the use of the targeting ELG, the windage, NL, can be measured and such variations accounted for. Thus, geometry and performance of the PMR pole 210 may be improved. Similar improvements may be achieved for other magnetic structures lapped using the targeting ELG 230 and the lapping ELG 250.

Figure 6:
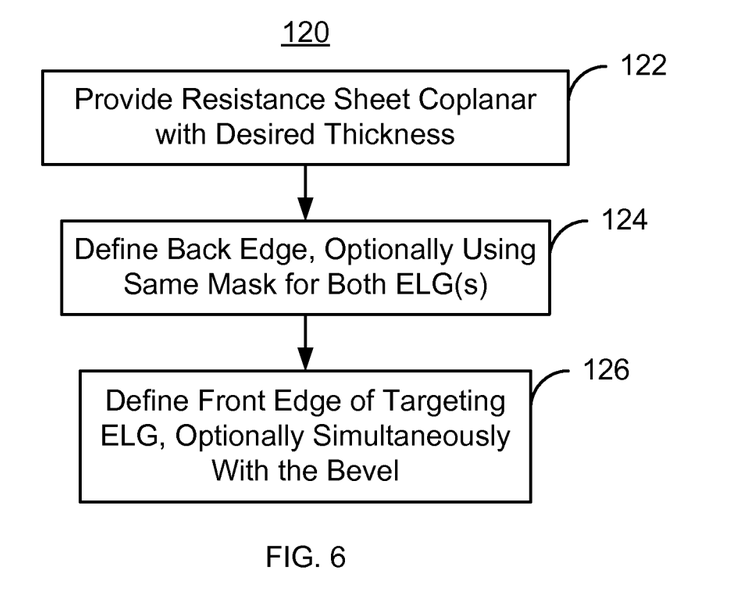
FIG. 6 is a flow chart depicting another exemplary embodiment of a method for providing ELG(s).

FIG. 6 is a flow chart depicting another exemplary embodiment of a method 120 for providing one or more ELG(s), particularly a targeting ELG. For simplicity, some steps of the method 120 may be omitted. The method 120 is described in the context of the magnetic structure (a PMR pole) 210, targeting ELG 230, and lapping ELG 250 shown in FIG. 5. However, the method 120 may be used for other magnetic structures in the write transducer 200 and/or a read transducer (not shown). In addition, although one lapping ELG 250 and one targeting ELG 230 are shown for a single PMR pole 210/transducer, in another embodiment, fewer or greater numbers of the lapping ELG 250 and/or targeting ELG 230 could be used per transducer 200. In addition, the same number of lapping ELGs 250 and targeting ELGs 230 per transducer 200 need not be used. Further, the method 120 is described in the context of a flare point and bevel. These features have the characteristics described above. The method 120 is also described in the context of a single structure 210 and two ELGs 230 and 250. However, the method 120 may be used for fabricating multiple transducers and/or multiple structures and may employ multiple ELG(s) at substantially the same time. In the embodiment shown, the ELG(s) being formed using the method 120 are lapped to the ABS location (the location at which the ABS is formed). However, in another embodiment, the ELG(s) may be used in other lapping step(s).

A resistive sheet substantially coplanar with the desired height of the PMR pole 210 is deposited, via step 122. Although described as being substantially coplanar with the desired height, the resistive sheet does have some nonzero, though small thickness. The lapping ELG 250 and the targeting ELG 230 may be formed from the resistive sheet. In another embodiment, the lapping ELG 250 and the targeting ELG 230 may be formed from different resistive sheets. In one embodiment, step 122 includes depositing a layer including at least one of Cr, Ru, Ta, and NiCr.

The back edge 232 of the targeting ELG 230 is defined from the resistive sheet, via step 124. In one such embodiment the back edge 252 of the lapping ELG 250 is also defined from the resistive sheet in step 124. In one embodiment, the back edges 232 and 252 are defined together in step 124 using a single mask. Thus, the back edges 232 and 252 may be located the same distance, NL, from the ABS location.

The front edge 234 of the targeting ELG 230 is defined, via step 126. Step 126 includes defining the front edge 234 so that it is at a position corresponding to the bevel. In one embodiment, step 126 includes forming the front edge and the bevel using a single processing step. In one such embodiment, a single mask that exposes a portion of the PMR pole 210 and the targeting ELG 230 is used. While the mask is in place, an ion mill may be performed on the PMR pole 210 and the targeting ELG 230. The ion mill may be performed at a nonzero angle from normal to the surface of the transducer 200 in order to obtain the desired shape of the bevel 212. Thus, the targeting ELG 320 may be formed. Once formed, the targeting ELG 234 may be used in fabricating a magnetic structure, such as the PMR pole 210.

Figure 7:
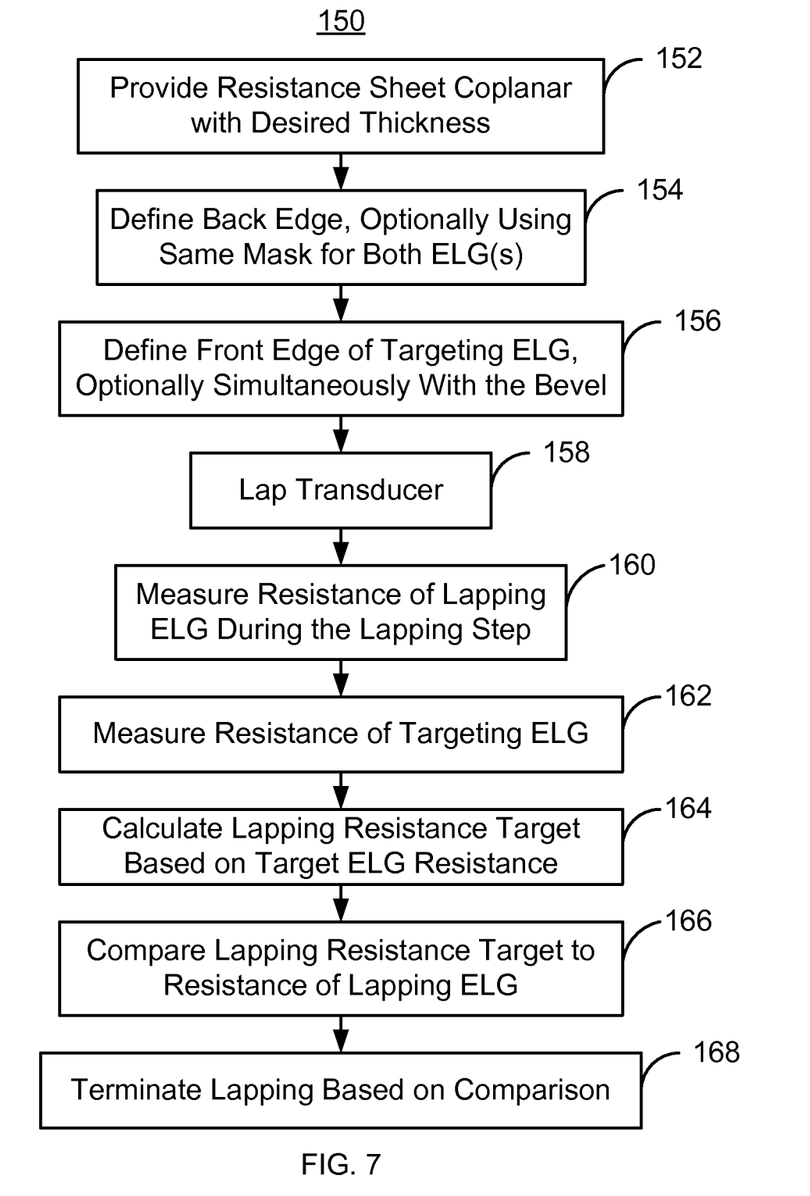
FIG. 7 is a flow chart depicting an exemplary embodiment of a method for providing and using targeting and lapping ELGs.

FIG. 7 is a flow chart depicting an exemplary embodiment of a method for providing and using targeting and lapping ELGs in fabrication of a magnetic structure. For simplicity, some steps of the method 150 may be omitted. FIGS. 8-12 are diagrams depicting three-dimensional views of an exemplary embodiment of a transducer 300 utilizing targeting and lapping ELGs during fabrication with which the method 150 is used. For clarity, FIGS. 8-12 are not to scale. The transducer 300 includes a magnetic structure 310, a targeting ELG 330, and a lapping ELG 350. The magnetic structure 310, targeting ELG 330, and lapping ELG 350 correspond to the magnetic structure 210, targeting ELG 230, and lapping ELG 250, respectively. The transducer may include other devices, including but not limited to coils and shields. For convenience, the magnetic structure 310, targeting ELG 330, and lapping ELG 350 are shown aligned vertically. However, in a physical device, the magnetic structure 310, targeting ELG 330, and lapping ELG 350 are aligned as described below. The transducer 300 also includes leads (not shown) for the ELGs 330 and 350. The transducer 300 may be part of a merged head including a read transducer and the write transducer. The transducer 300 may reside on a slider (not shown). The method 150 is described in the context of a transducer 300 in which the magnetic structure being fabricated is a PMR pole 310. However, the method 150 may be used for other magnetic structures in the write transducer 300 and/or a read transducer (not shown). In addition, although one lapping ELG 350 and one targeting ELG 330 are shown for a single PMR pole 310/transducer 300, in another embodiment, fewer or greater numbers of the lapping ELG 350 and/or targeting ELG 330 could be used per PMR pole 310/transducer 300. In addition, the same number of lapping ELGs 350 and targeting ELGs 330 per PMR pole 310/transducer 300 need not be used. Further, the method 150 and transducer 300 are described in the context of a flare point and bevel. The flare point corresponds to a point of interest from which distance to the desired ABS, such as a windage, is measured. Consequently, in some embodiments, the magnetic structure fabricated using the method 150 may include some other feature corresponding to the flare point. Similarly, the bevel corresponds to a surface, top or bottom, of the magnetic structure 310 which is not perpendicular to the ABS. The method 150 is also described in the context of a single structure 310 and two ELGs 330 and 350. However, the method 150 may be used for fabricating multiple transducers and/or multiple structures and may employ multiple ELG(s) at substantially the same time. Referring to FIGS. 7-12, the magnetic structure being fabricated has may be desired to adjoin the ABS. Thus, in the embodiment shown, the lapping being performed using the method 150 proceeds to the ABS location (the location at which the ABS is formed). However, in another embodiment, the lapping using the method 150 may be used to expose another surface. The PMR pole 310 being formed has a desired thickness, h, a bevel 202, and a flare point 306 a distance, NL (for nose length or windage) from the ABS. The PMR pole 310 may also have a desired track width, TW, and a surface 204 desired to be at the ABS once lapping is completed.

Figure 8:
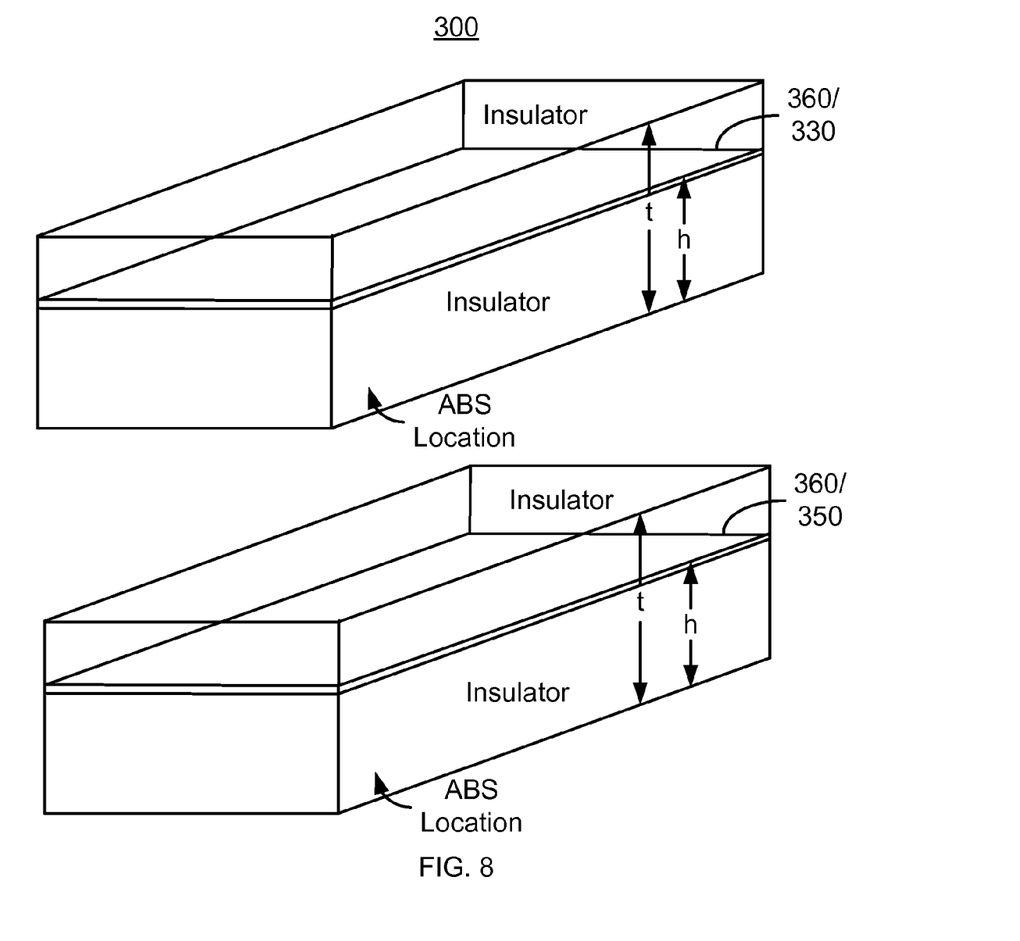
FIGS. 8-12 are diagrams depicting three-dimensional views of an exemplary embodiment of a head utilizing targeting and lapping ELGs during fabrication.

A resistive sheet substantially coplanar with the desired thickness of the PMR pole 310 is provided, via step 152. The resistance sheet is to be used for forming a lapping ELG and a targeting ELG. FIG. 8 depicts the transducer 300 after step 152 is performed. A resistive sheet 360 from which the ELGs 330 and 350 are to be formed is also shown. Because the ELGs 330 and 350 are to be provided, the sheet is labeled 360/330 and 360/350. As can be seen in FIG. 8, the resistive sheet 360 is at the desired height, h. in one embodiment, the bottoms of the PMR pole (not shown in FIG. 8) and insulating layer on which the resistive sheet is formed are coplanar. Thus, the resistive sheet is coplanar with the desired top of the PMR pole (not shown in FIG. 8) at the ABS. The thickness, t, of the yoke of the PMR pole (not shown in FIG. 8) is greater than the height at which the resistive sheet 360 is formed.

Figure 9:
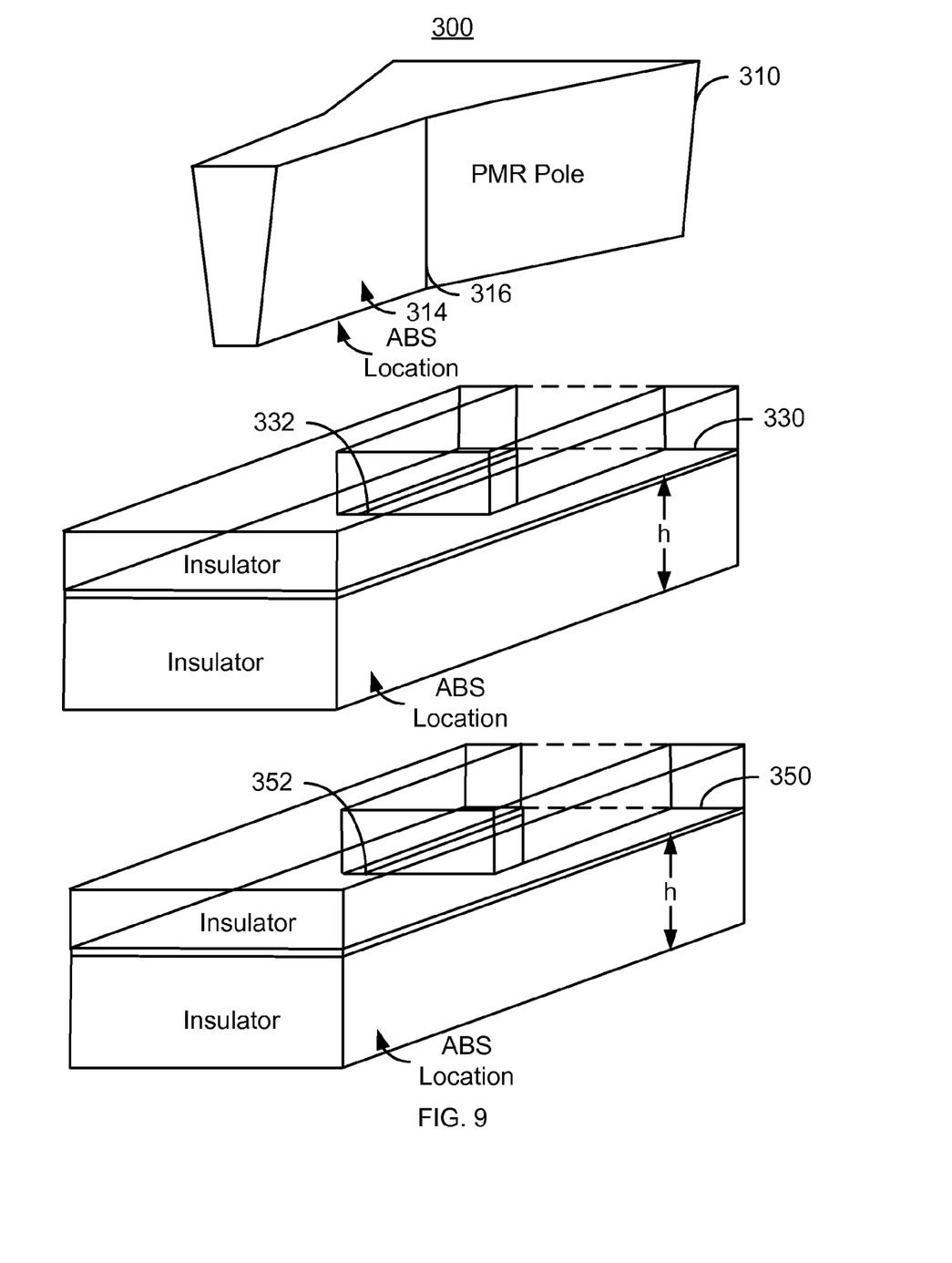

The back edges of the targeting ELG 330 and lapping ELG 350 are defined from the resistive sheet 360, via step 154. In one embodiment, the back edges are defined using a single mask. FIG. 9 depicts the transducer 300 after step 154 is performed. In the embodiment shown, the PMR pole 310 has been partially formed. Thus, the sidewalls 314 and flare point 316 have been formed. The sidewalls 314 have a reverse angle. As a result, the top of the PMR pole 310 is wider than the bottom. The dashed lines in FIG. 9 indicate where material may have been removed in previous steps. Consequently, the back edge 332 of the targeting ELG 330 and the back edge 352 of the lapping ELG 350 are shown. Step 154 is performed such that the back edges 352 and 332 of the lapping ELG 350 and targeting ELG 330, respectively, are each substantially aligned with the flare point 316. Thus, the distance from the ABS location to the back edge 352 of the lapping ELG 350, the distance from the ABS location to the back edge 332 of the targeting ELG 330, and the distance between the ABS location and the flare point 316 are desired to be the same.

Figure 10:
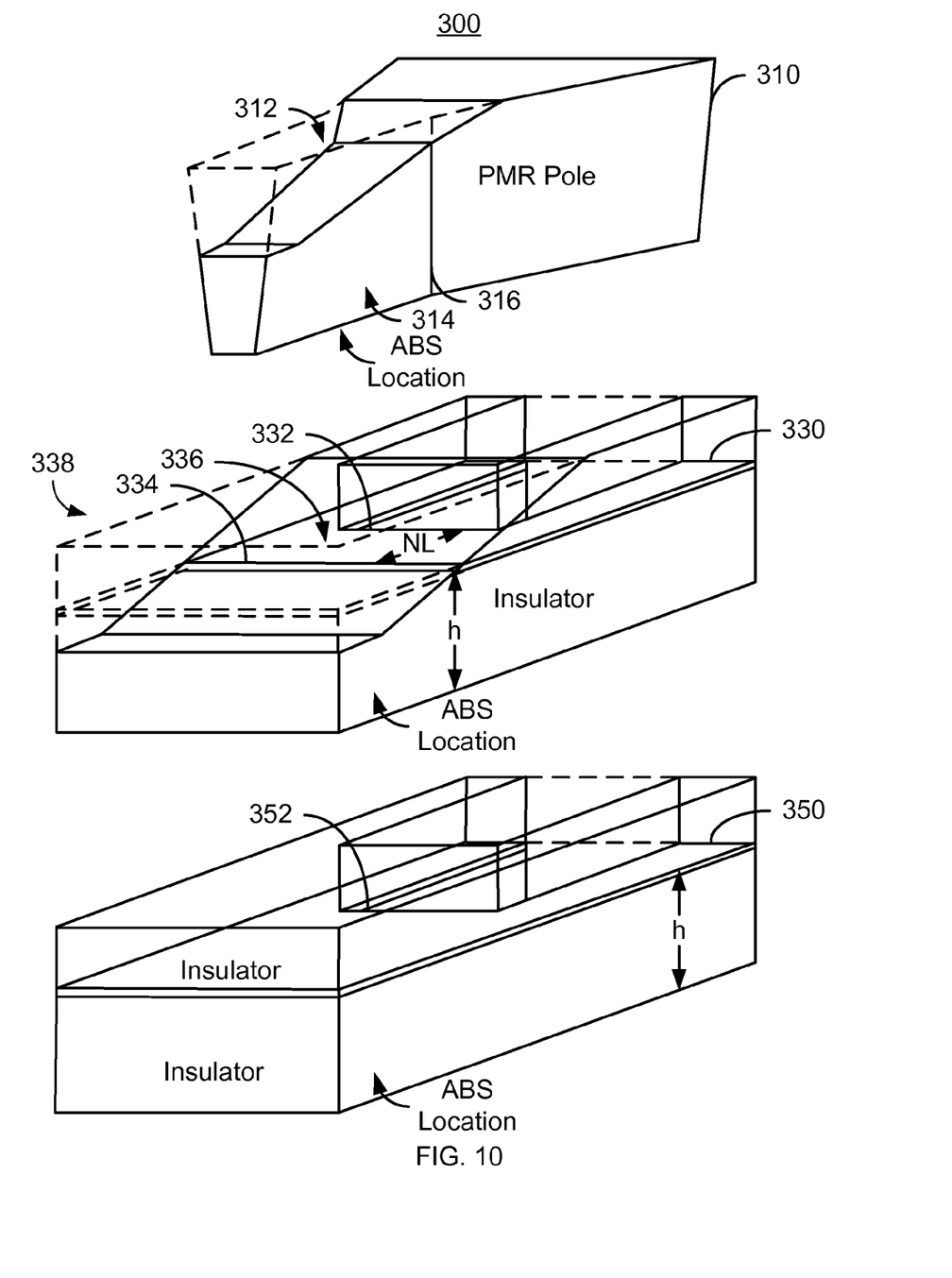

A bevel for the PMR pole 310 and the front edge of the targeting ELG 330 are formed, via step 156. In one embodiment, a single mask is used to form the bevel and the front edge. In addition, a single process step such as an ion mill at a nonzero angle from normal to the surface of the transducer 300 may be used in forming the bevel and the front edge of the targeting ELG 330. Thus, step 156 defines the front edge of the targeting ELG 330 to correspond to an intersection of the bevel and the desired thickness of the PMR pole 310. FIG. 10 depicts the transducer 300 after step 156 is formed. The dashed lines in FIG. 10 indicate where material has been removed in previous steps. Thus, a bevel 312 has been formed in the PMR pole 310. In addition, a portion 338 of the targeting ELG and surrounding material have been removed. Consequently, a front edge 334 of the targeting ELG has been formed at a location corresponding to the bevel 312 and the desired height h.

The transducer is lapped, via step 158. In addition, the resistance of the lapping ELG 350 is measured during the lapping step, via step 160. Step 160 may take place numerous times over the lapping step 158. Stated differently, the resistance of the lapping ELG 350 is monitored during lapping. The resistance of the targeting ELG is also measured, via step 162. Step 162 may take place before lapping commences in step 158 and/or during lapping. A resistance target for the lapping ELG 350 is calculated based on the targeting ELG resistance of the targeting ELG, via step 164. Stated differently, the targeting ELG resistance informs the resistance target for the lapping ELG 350. The calculation in step 164 may be performed before and/or during lapping.

Figure 11:
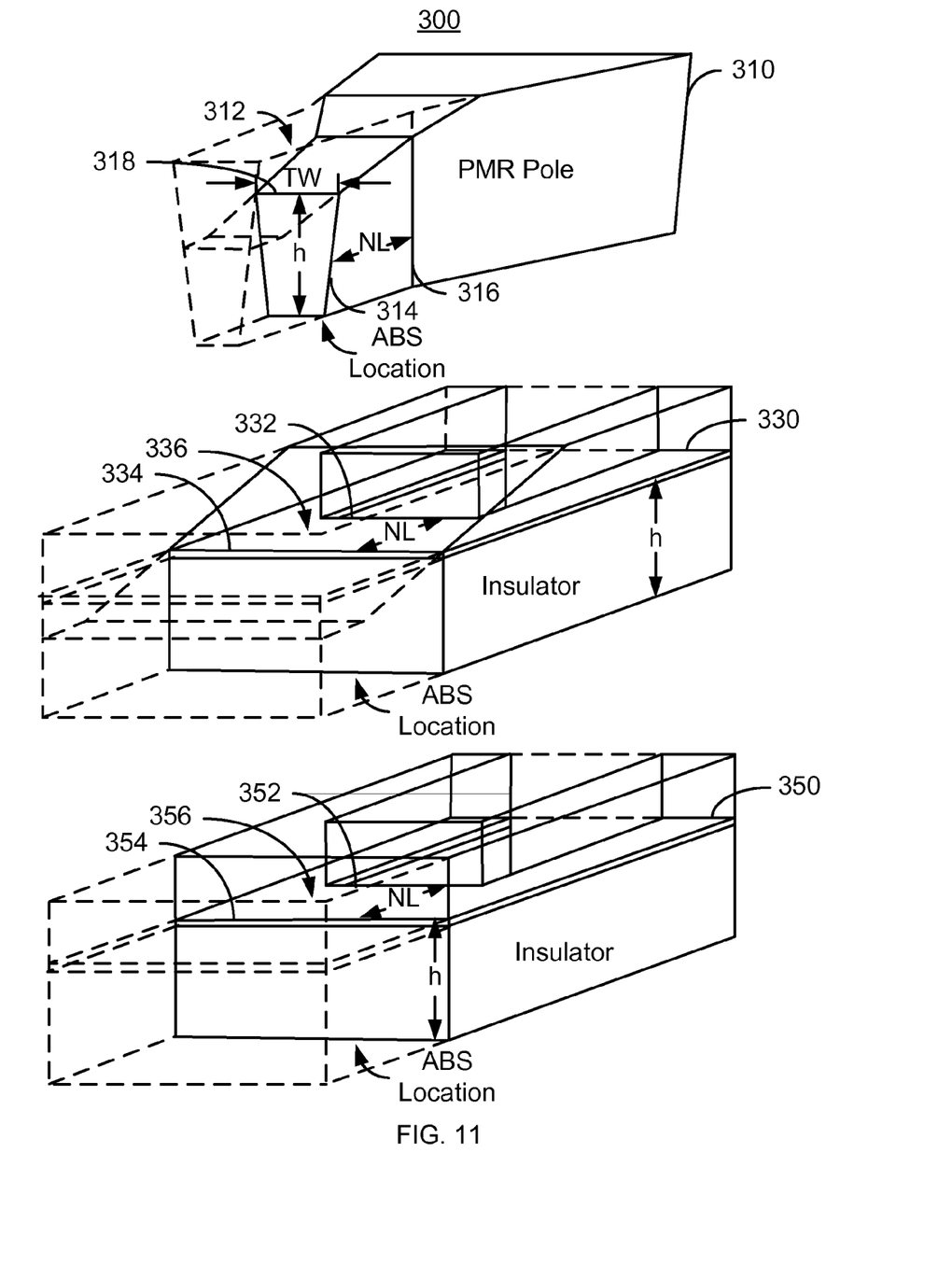
Figure 12:
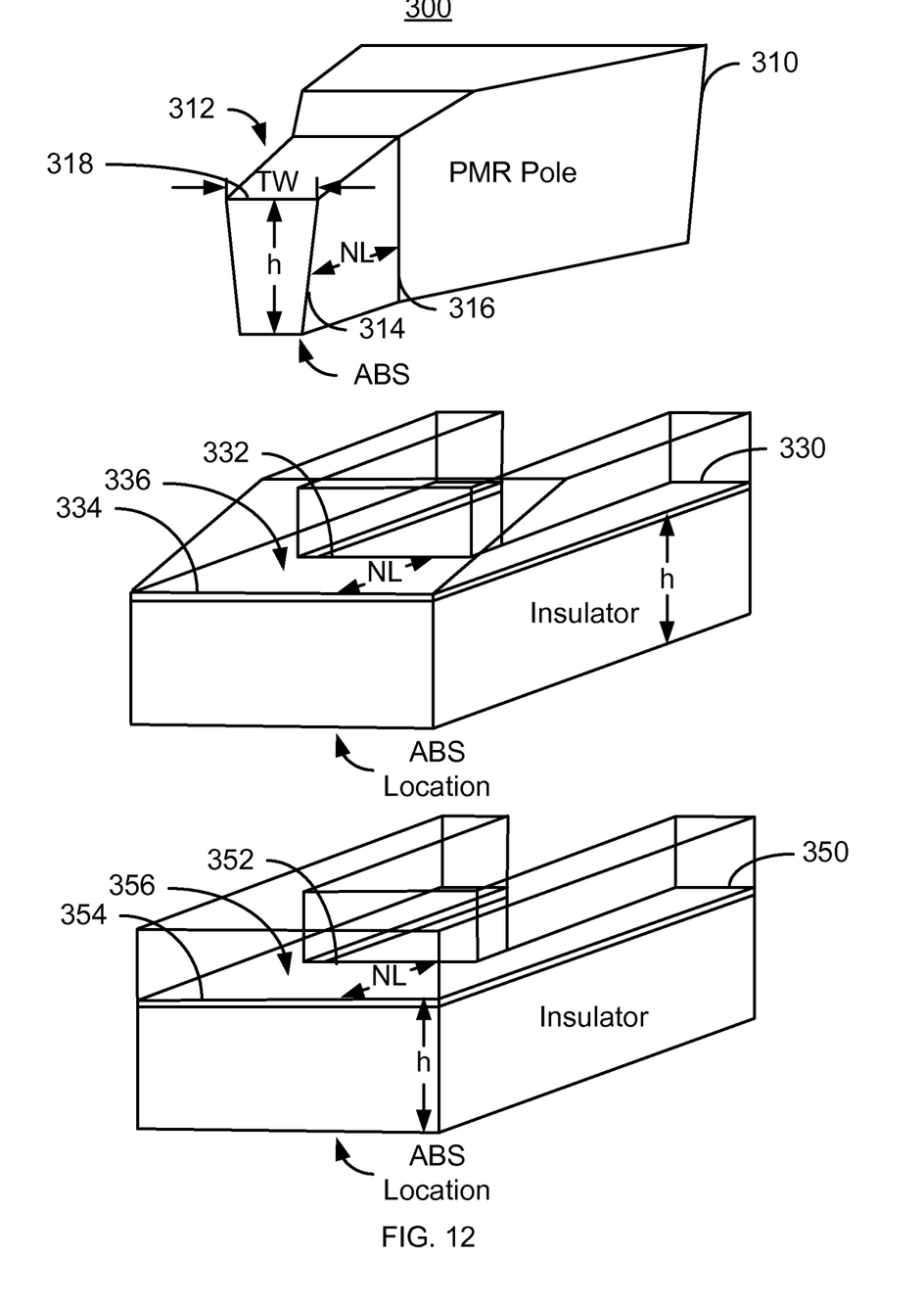

The current resistance of the lapping ELG 350 is compared to the calculated lapping ELG resistance target, via step 166. Thus, it can be determined in step 166 whether the resistance target for the lapping ELG 350 has been met. Knowledge of the sheet resistance of the targeting ELG 330 allows the windage to be determined from the measured resistance and the sheet resistance. Finally, lapping is terminated based on this comparison, via step 168. Thus, the transducer 300 may be lapped until the ABS location is exposed. In addition, the transducer 300 may be under-lapped, over-lapped, or lapped to the edge 334 of the targeting ELG 330. FIGS. 11-12 depict the transducer 300 after step 168 is performed. FIG. 11 depicts the transducer 300 while showing material that has been removed in dashed lines. FIG. 12 depicts the remaining portions of the transducer 300 only. Thus, the desired track width TW, pole height h, and windage NL have been achieved.

Through the use of the method 150, the lapping may be better controlled. In particular, the PMR pole 310 having the desired height, h, the desired track width, TW, and the desired windage NL may be formed. The variations in the height of the PMR pole 310, width of the PMR pole 310 and the windage may be accounted for using a combination of the ELGs 330 and 350. Similarly, processing variations may be determined and accounted for. Thus, geometry and performance of the PMR pole 310 may be improved. Similar improvements may be achieved for other magnetic structures lapped using the targeting ELG 230 and the lapping ELG 350.

We claim:

1. A method for providing at least one transducer including a magnetic structure and having an air-bearing surface (ABS), the magnetic structure having a desired thickness, a bevel, and a flare point a distance from the ABS, the method comprising:
   providing a lapping electronic lapping guide (lapping ELG) substantially coplanar with the desired thickness of the magnetic structure and having a lapping ELG back edge at the distance from the ABS such that the lapping ELG back edge is substantially aligned with the flare point;
   providing a targeting electronic lapping guide (targeting ELG) substantially coplanar with the desired thickness of the magnetic structure and having a targeting ELG back edge and a targeting ELG front edge, the targeting ELG back edge at the distance from the ABS such that the targeting ELG back edge is substantially aligned with the flare point, the targeting ELG front edge at a front edge distance from the ABS corresponding to an intersection of the bevel and the desired thickness;
   lapping the transducer; and
   terminating the lapping based on a first resistance of the lapping ELG and a second resistance of the targeting ELG.

2. The method of claim 1 wherein the magnetic structure is a pole having the bevel and a plurality of sides, the plurality of sides having a reverse angle.

3. The method of claim 1 further comprising:
   providing a resistive sheet substantially coplanar with the desired thickness, the lapping ELG and the targeting ELG being formed from the resistive sheet.

4. The method of claim 3 wherein the step of providing the lapping ELG includes:
   defining the lapping ELG back edge from the resistive sheet.

5. The method of claim 4 wherein the step of providing the targeting ELG includes:
   defining the targeting ELG back edge from the resistive sheet.

6. The method of claim 5 wherein the step of defining the lapping ELG back edge and the step of defining the targeting ELG back edge are performed using a single mask.

7. The method of claim 1 wherein the step of providing the targeting ELG further includes:
   forming the front edge and the bevel using a single processing step.

8. The method of claim 7 wherein the single processing step includes an ion mill.

9. The method of claim 1 wherein each of the targeting ELG and the lapping ELG includes at least one of Cr, Ru, Ta, and NiCr.

10. The method of claim 1 wherein the step of terminating the lapping further includes:
    measuring the first resistance of the lapping ELG during the lapping step;

measuring the second resistance of the targeting ELG during the lapping step;
calculating a lapping ELG resistance target based on the second resistance;
comparing the first resistance to the lapping ELG resistance target; and
terminating the lapping based on the comparing step.

11. The method of claim 1 wherein the step of terminating the lapping further includes:
pre-measuring the second resistance of the targeting ELG prior to the lapping step;
calculating a lapping ELG resistance target based on the second resistance;
measuring the first resistance of the lapping ELG during the lapping step;
comparing the first resistance to the lapping ELG resistance target; and
terminating the lapping based on the comparing step.

12. The method of claim 1 wherein each of the at least one transducer corresponds to the targeting ELG and the lapping ELG.

13. The method of claim 1 wherein a portion of the at least one transducer corresponds to the targeting ELG and the lapping ELG.

14. A method for providing at least one transducer including magnetic structure and having an air-bearing surface (ABS), the magnetic structure having a desired thickness, a bevel, a flare point a first distance from the ABS, and a plurality of sides, the plurality of sides having a reverse angle, the method comprising:
providing a resistive sheet substantially coplanar with the desired thickness, the resistance sheet for forming a lapping electronic lapping guide (lapping ELG) and a targeting electronic lapping guide (targeting ELG) being formed from the resistive sheet;
defining a lapping ELG back edge of the lapping ELG and a targeting ELG back edge of the targeting ELG at the first distance from the ABS using a first mask such that the lapping ELG back edge and the targeting ELG back edge are each substantially aligned with the flare point;
forming the bevel and a front edge of the targeting ELG using a second mask such that the front edge is a second distance from the ABS corresponding to an intersection of the bevel and the desired thickness;
lapping the transducer;
measuring a first resistance of the lapping ELG during the lapping step;
measuring a second resistance of the targeting ELG;
calculating a lapping ELG resistance target based on the second resistance;
comparing the first resistance to the lapping ELG resistance target; and
terminating the lapping based on the comparing step.

* * * * *